3,284,456
METHOD OF PRODUCING PYRIDINE, 2-PICOLINE AND 4-PICOLINE
Akira Shimizu, Hirakata, and Kiyonori Igarashi, Joto-ku, Osaka, Japan, and Junichi Hashimoto, deceased, late of Osaka, Japan, by Shigako Hashimoto, executor, Joto-ku, Osaka, Japan, assignors to Koei Chemical Co., Ltd., Doshomachi, Higashi-ku, Osaka, Japan
No Drawing. Filed Nov. 12, 1963, Ser. No. 323,160
3 Claims. (Cl. 260—290)

This invention relates to a method for the production of pyridine bases, and more particularly to an improved method for the production of pyridine, 2-picoline and 4-picoline while minimizing the formation of 3-picoline.

Pyridine, 2-picoline and 4-picoline are important chemicals as intermediates for the production of various pharmaceuticals and other useful chemical products such as synthetic resins, surfactants, etc. and also as organic solvents. Pyridine is also commercially useful as a basic solvent, as a raw material and as a catalyst in certain organic reactions. 2-picoline is useful as a solvent and as a raw starting or intermediate material for the production of dyes, resins, disinfectants, vulcanization accelerators, etc. And, 2-picoline can be converted to 2-vinylpyridine which is useful in the industry of synthetic fibers, synthetic rubber, adhesives, paints, etc. 4-picoline is used as a main raw material for the production of a tuberculosis controlling agent, isonicotinic acid hydrazide, and also other pharmaceuticals, synthetic resins, dyes, etc. Other uses and applications of pyridine, 2-picoline and 4-picoline are well known in the art.

So far, pyridine bases have been produced as byproducts of coal-tar industry. However, the coal-tar industry is insufficient in its productive capacity to satisfy the increasing demand for pyridine bases.

Various methods have been proposed to chemically synthesize these pyridine bases. Thus it has been proposed to produce 2-picoline and 4-picoline by a catalytic vapor phase reaction of acetaldehyde with ammonia. It has also been proposed to produce pyridine and 3-picoline by a catalytic reaction of formaldehyde, acetaldehyde and ammonia in a vapor phase at an elevated temperature.

In some cases, however, it is desired to concurrently produce pyridine together with 2- and 4-picolines in a high yield while minimizing the formation of 3-picoline. In producing pyridine, 2-picoline and 4-picoline it is very important to minimize the by-production of 3-picoline, because the boiling point of 3-picoline and that of 4-picoline are so close to each other that the separation of them is extremely difficult and requires a troublesome and expensive method such as that disclosed in U.S. Patent No. 2,728,771, dated December 27, 1955, wherein 4-picoline is separated as the oxalate.

There has neither been known nor suggested a method for producing pyridine together with 2- and 4-picolines in a substantial yield by a catalytic vapor phase reaction system. More particularly according to the prior art, efforts have been directed either to the production of 2-picoline and 4-picoline free from pyridine or to the production of pyridine and 3-picoline, and there has been no consideration that pyridine, 2-picoline and 4-picoline can concurrently be produced without the formation of a substantial amount of 3-picoline. Furthermore, there has been no report on the production of 2- and 4-picolines in the process for producing pyridine using formaldehyde as the reactant along with acetaldehyde.

Therefore, an object of this invention is to provide a novel method for concurrently producing pyridine, 2-picoline and 4-picoline in a high yield.

Another object of this invention is to provide a novel method for concurrently producing pyridine, 2-picoline and 4-picoline in a high yield and in a pure state by a catalytic vapor phase reaction of formaldehyde, acetaldehyde and ammonia.

Still another object of this invention is to provide a novel method for concurrently producing pyridine, 2-picoline and 4-picoline in a high yield while minimizing the formation of 3-picoline, by a catalytic vapor phase reaction of formaldehyde, acetaldehyde and ammonia.

Still another object of this invention is to provide a method for concurrently producing pyridine, 2-picoline and 4-picoline in a high yield, wherein the proportions of pyridine, 2-picoline and 4-picoline may be varied in response to the particular demand.

Other objects, advantages and features of this invention will be apparent from the following description.

We have found that a mixture of pyridine bases wherein pyridine, 2-picoline and 4-picoline predominate and the content of by-products such as 3-picoline and other picoline derivatives is substantially small is obtained when a gaseous mixture of formaldehyde, acetaldehyde and ammonia wherein the proportion of acetaldehyde is not less than 5.0 moles and not more than 25.0 moles per mole of formaldehyde and the proportion of ammonia is from 0.5 to 10 moles inclusive per mole of total aldehydes, is allowed to react in the presence of a catalyst known per se at a temperature of 400° C. to 550° C.

The novelty and unexpected feature of this invention will be apparent when considered in the light of the prior arts as follows:

In United States Patent No. 2,698,849, dated January 4, 1955, there is disclosed the production of 2- and 4-picolines by reacting acetaldehyde with ammonia over a silica-alumina (12–18% alumina) catalyst containing 0.1 to 5% of an element of the 4th group of the periodic table in the vapor phase, but in this method no formaldehyde is employed and pyridine cannot be produced. British Patent No. 790,994, published on February 19, 1958, discloses that pyridine and 3-picoline are produced by reacting formaldehyde, acetaldehyde and ammonia over a silica-alumina catalyst comprising an oxide of a metal having a valency of 3 or 4, in the vapor state at a temperature ranging from 400° C. to 500° C., but in this case 2- and 4-picolines are produced little, and therefore, if 3-picoline is not required but 2- and 4-picolines are desired, this method is not applicable.

Another reference, British Patent No. 816,973, published on July 22, 1959, also discloses that pyridine and 3-picoline are produced by reacting formaldehyde, acetaldehyde and ammonia in the presence of methanol and of a catalyst which is useful in the production of 2- and 4-picolines from acetylene and ammonia, and that the proportion of acetaldehyde used should not be greater than 2 moles per mole of formaldehyde. In contrast, according to the present invention, pyridine and 2- and 4-picolines are produced in high yield, and by-production of 3-picoline and other picoline derivatives are minimized. Thus, it is a novel and unexpected finding that 2- and 4-picolines can be produced together with pyridine but substantially free from 3-picoline even when a mixture of acetaldehyde and formaldehyde is used.

In carrying out the method of this invention, any catalyst and any reaction condition known in the art of the production of pyridine bases by vapor phase catalytic reaction involving the use of aldehyde(s) and ammonia as reactants may be used, except the particular molar ratio of acetaldehyde to formaldehyde which is the most important feature of this invention.

Thus a gaseous mixture of formaldehyde, acetaldehyde and ammonia may be continuously introduced in a reactor containing or filled with a catalyst and maintained at an elevated temperature.

Various types of catalyst in the reactor may be used including fixed bed type, moving bed type and fluidizing bed type. As mentioned above the catalyst may be any known per se as useful in the production of 2- and 4-picolines from acetaldehyde and ammonia. Examples of useful catalysts are silica, alumina, silica-alumina, silica-magnesia, etc., among which silica-alumina is preferred. The content of alumina in the silica-alumina catalyst may vary over a wide range although a silica-alumina catalyst containing 5–25% by weight of alumina is preferable. It is also preferable to combine a suitable co-catalyst with the above mentioned main catalyst such as silica-alumina. Examples of useful co-catalyst are metals of the second, third, fourth and eighth groups of the Mendeleev's Periodic Table and oxides of these metals. Practically at least one of Zn, Cd, Th, Co and oxides thereof may be used as the co-catalyst. The amount of the co-catalyst may be in an amount of 0.1 to 15% by weight based upon the total weight of the catalyst.

The addition of the co-catalyst to the main catalyst, e.g., silica-alumina may be conducted by a conventional manner such as co-precipitation or impregnation. For example, a catalyst useful in the present invention may be prepared by the following method. To a silica gel newly prepared from sodium silicate by addition of an acid an aqueous solution of a salt of aluminum and a salt of cadmium or zinc such as in the form of nitrate, sulfate and chloride is added and the mixture is added with alkali such as an aqueous solution of ammonia while stirring, to co-precipitate the aluminum and cadmium or zinc in the form of hydroxide on the silica. The mass is then washed with water to remove any water-soluble material and then molded, dried and calcinated. The catalyst thus prepared, when used in the condition of the present invention, holds its activity for about several ten hours, and the regeneration of the spent catalyst is easily carried out by passing hot air to the catalyst bed to burn away carbon and organic substances deposited on the surface of the catalyst.

The gaseous reactants, i.e., formaldehyde, acetaldehyde and ammonia may be mixed together. Alternatively, formaldehyde gas and acetaldehyde gas are mixed and the mixture is then mixed with gaseous ammonia. The mixing of the reactants may preferably be conducted prior to the introduction to the reaction zone. The gaseous mixture may preferably be preheated nearly to the reaction temperature. In any case the aldehydes and ammonia should be mixed or contacted after both have been preheated separately at least about 250° C. If aldehydes and ammonia are contacted together at a temperature lower than 250° C. they will form adducts which would blockade the reactor and consequently prevent the reactant gas from flowing through the reactor.

The temperature in the reaction zone may vary within the range from 400° C. to 550° C., more preferably 430° C. to 480° C.

The contacting time of the gaseous reaction mixture may be within the range of from 0.1 to 7 seconds (space velocity, 36,000 hr.$^{-1}$ to 514 hr.$^{-1}$).

Generally the reaction is carried out under ordinary or atmospheric pressure, but it may be carried out under somewhat super-atmospheric or sub-atmospheric pressure if desired or necessary.

The effluent gas discharged from the reactor after the reaction may be treated in a conventional manner to recover the desired pyridine bases. Thus, for example, the discharged gaseous product is condensed, and the oily layer is separated and dried over a dryer such as solid alkali hydroxide, and then distilled fractionally to obtain pyridine, 2-picoline and 4-picoline in pure state.

As the reactant formaldehyde, not only formaldehyde but also any substance such as formalin (an aqueous formaldehyde solution), paraformaldehyde, trioxane, methylal, methyl hemiformal or a mixture of two or more of them which can generate formaldehyde under the reaction condition may be used. Similarly, as the reactant acetaldehyde, not only acetaldehyde but also any substance such as paraldehyde or a mixture of acetaldehyde and paraldehyde which can generate acetaldehyde under the reaction condition may be used. Therefore, it should be understood that the term "formaldehyde" and the term "acetaldehyde" as used in this specification and claims refer not only to the respective aldehydes but also to aldehyde generating substances exemplified above.

The ammonia content in the reaction mixture may vary over a wide range, e.g. from 0.5 mole to 10 moles inclusive, perferably 1 to 1.5 moles, per mole of total aldehydes.

As mentioned before, the important feature of this invention is in the particular molar ratio of acetaldehyde to formaldehyde in the reaction mixture, because the invention is directed solely to the production of pyridine, 2-picoline and 4-picoline and is based upon the finding that the molar ratio of acetaldehyde to formaldehyde definitely affect the yield of pyridine, 2-picoline and 4-picoline along with the minimization of the formation of 3-picoline. More particularly, it has been found that, as will be seen in the examples illustrated hereinafter, with the increase of the molar ratio of acetaldehyde to formaldehyde the yield of pyridine decreases and the yields of both 2-picoline and 4-picoline increase while the yield of 3-picoline decreases to a much lower value, and therefore that the molar proportion of the aldehydes may be suitably selected within the specific range of this invention depending upon the particular demand of pyridine or 2- and 4-picolines.

Thus, according to the present invention, acetaldehyde must be used in an amount of not less than 5.0 moles but not more than 25.0 moles per mole of formaldehyde. If the amount of acetaldehyde used is less than 5.0 moles per mole of formaldehyde, the formation of 3-picoline which makes the purification of 4-picoline difficult would unduly increase. In order also to keep the purity of separated 4-picoline higher than 90%, the molar ratio of acetaldehyde to formaldehyde must be not less than 5. On the contrary, if the amount of acetaldehyde used is more than 25.0 moles per mole of formaldehyde the yield of pyridine would become very low and this would deviate from the purpose of this invention, although the formation of 3-picoline is reduced.

In order to illustrate the present invention but not to limit the same, the following examples are given. Throughout the examples, each yield of pyridine and picolines was based upon the carbon contained in the charged aldehydes and assuming that other bases had not been produced. More precisely speaking the yield of pyridine was calculated assuming that where all carbon contained in the charged aldehydes serves to constitute pyridine and not to constitute picolines the pyridine yield is theoretically 100%. The same is applied to each of picolines.

Example 1

An aqueous solution containing 37% aqueous formaldehyde solution (formalin) and acetaldehyde at the mole ratio of 10 moles of acetaldehyde per one mole of formaldehyde was vaporized at the rate of 4.3 grams per minute, and preheated up to a temperature of about 250° C. On the other hand ammonia gas was flowed at the rate of 1.9 litres per minute at ordinary temperature and pressure, and preheated up to a temperature of about 250° C. The both gas streams were mixed and passed through a catalyst bed containing 350 cc. of silica-alumina catalyst consisting of 82% of silica, 15% of alumina and 3% of zinc oxide. The temperature of the catalyst layer was kept at 440° C. during the reaction. The effluent gas mixture of product and unreacted material out of the reactor was cooled to condense. The condensed liquid was added with solid sodium hydroxide to isolate dried crude pyridine bases (greenish grey oily products). The crude pyridine bases were fractionally distilled with carefulness to separate pyridine, 2-picoline and 4-picoline. The yield and purity of each of thus obtained pyridine bases were as follows: pyridine, yield 14.7% (purity 98%); 2-picoline, yield 18.9% (purity 98%); 4-picoline, yield 17.5% (purity 97%).

*Example 2*

A series of experiments was carried out in the same manner as in Example 1 except that some conditions were varied as shown in the following table which also show the results of these experiments.

dehyde, whereby pyridine, 2-picoline, and 4-picoline are concurrently produced without formation of a substantial amount of 3-picoline.

2. The process according to claim 1 wherein the molar ratio of ammonia to total aldehydes is from 0.5 to 10.

3. The process according to claim 1 wherein the catalyst is silica/alumina combined with a co-catalyst selected from the group consisting of Zn, Cd, Th, Co, and oxides thereof.

TABLE I

| Run No. | Kind and mole ratio of reactant | | | Catalyst | S.V.$^{-1}$ | Reaction temperature, °C. | Pyridine yield, percent | Picoline yield, percent | | |
|---|---|---|---|---|---|---|---|---|---|---|
| | | | | | | | | 2-picoline | 3-picoline | 4-picoline |
| 1 | Formaldehyde, 1 mole. | Acetaldehyde, 3.5 mole. | Ammonia, 4 mole | $SiO_2:Al_2O_3:ZnO$ | 718 | 440 | 30.6 | 11.9 | 5.8 | 8.5 |
| 2 | do | Acetaldehyde, 5 mole. | Ammonia, 5.5 mole | $SiO_2:Al_2O_3:ZnO$ | 910 | 440 | 26.6 | 13.1 | 1.7 | 12.2 |
| 3 | do | Acetaldehyde, 7 mole. | Ammonia, 7.5 mole | $SiO_2:Al_2O_3:ZnO$ | 870 | 440 | 18.0 | 16.8 | 0.8 | 14.6 |
| 4 | do | Acetaldehyde, 10 mole. | Ammonia, 10 mole | $SiO_2:Al_2O_3:ZnO$ | 760 | 440 | 14.7 | 18.9 | 0.5 | 17.0 |
| 5 | do | Acetaldehyde, 20 mole. | Ammonia, 20 mole | $SiO_2:Al_2O_3:ZnO$ | 933 | 435 | 9.1 | 21.5 | 0.1 | 20.6 |
| 6 | Trioxane, 1 mole. | Paraldehyde, 10 mole. | Ammonia, 30 mole | $SiO_2:Al_2O_3:ZnO$ | 1,110 | 450 | 15.0 | 18.5 | 0.4 | 16.9 |
| 7 | do | do | do | $SiO_2:Al_2O_3:CdO$ | 1,110 | 445 | 14.5 | 18.6 | 0.5 | 18.2 |
| 8 | Methylal, 1 mole. | Acetaldehyde, 10 mole. | Ammonia, 10 mole | $SiO_2:Al_2O_3:CdO$ | 940 | 440 | 14.3 | 18.5 | 0.4 | 17.9 |

What we claim is:

1. In a process for producing pyridine and pyridine bases by heating to a temperature of from 400° to 550° C. a gaseous reaction mixture of formaldehyde, acetaldehyde, and ammonia in the presence of a pyridine catalyst selected from the group consisting of silica, alumina, silica/alumina, and silica/magnesia, the improvement wherein the amount of acetaldehyde is not less than 5.0 moles and not more than 25.0 moles per mole of formal-

References Cited by the Examiner
FOREIGN PATENTS 742,643   12/1955   Great Britain.
900,799   7/1962   Great Britain.

WALTER A. MODANCE, *Primary Examiner.*

NICHOLAS S. RIZZO, JOHN D. RANDOLPH, M. W. WESTERN, ALAN L. ROTMAN,
*Assistant Examiners.*